(12) United States Patent
Knoedgen

(10) Patent No.: US 8,853,959 B2
(45) Date of Patent: Oct. 7, 2014

(54) METHOD AND SYSTEM FOR AVOIDING FLICKER OF SSL DEVICES

(71) Applicant: Dialog Semiconductor GmbH, Kirchheim/Teck-Nabern (DE)

(72) Inventor: Horst Knoedgen, Munich (DE)

(73) Assignee: Dialog Semiconductor GmbH, Kirchheim/Tech-Nabern (DE)

(*) Notice: Subject to any disclaimer, the term of this patent is extended or adjusted under 35 U.S.C. 154(b) by 0 days.

(21) Appl. No.: 13/778,957

(22) Filed: Feb. 27, 2013

(65) Prior Publication Data

US 2013/0221862 A1    Aug. 29, 2013

(30) Foreign Application Priority Data

Feb. 28, 2012  (EP) ..................... 12157382

(51) Int. Cl.
*H05B 37/02*  (2006.01)
*H05B 33/08*  (2006.01)

(52) U.S. Cl.
CPC ............ *H05B 37/02* (2013.01); *H05B 33/0845* (2013.01)
USPC ........ 315/287; 315/200 R; 315/224; 315/247; 315/291; 315/307

(58) Field of Classification Search
USPC ...... 315/200 R, 224, 247, 287, 291, 297, 307
See application file for complete search history.

(56) References Cited

U.S. PATENT DOCUMENTS

| | | | |
|---|---|---|---|
| 5,291,299 A * | 3/1994 | Karna | 315/323 |
| 8,552,663 B2 * | 10/2013 | Welten | 315/307 |
| 2009/0184662 A1 | 7/2009 | Given et al. | |
| 2012/0194079 A1 | 8/2012 | Clauberg et al. | |
| 2013/0119882 A1 | 5/2013 | Mao et al. | |

FOREIGN PATENT DOCUMENTS

| | | |
|---|---|---|
| EP | 14161289 | 5/2014 |
| WO | WO 2012/009086 | 1/2012 |

OTHER PUBLICATIONS

European Search Report, Dialog Semiconductor GmbH, 12157382.8-2206, Mail date—Aug. 3, 2012.

* cited by examiner

*Primary Examiner* — Douglas W Owens
*Assistant Examiner* — Thai Pham
(74) *Attorney, Agent, or Firm* — Saile Ackerman LLC; Stephen B. Ackerman

(57) ABSTRACT

This disclosure relates to illumination systems. In particular it relates to a method and system for avoiding flicker (in particular 100 Hz or 120 Hz flicker) in solid state lighting devices such as LED or OLED assemblies. A controller for a driver circuit of a solid state lighting device (SSL) is described. The driver circuit comprises a power converter to convert a varying input voltage into a drive voltage for the SSL device. The input voltage is derived from a rectified AC mains voltage and frequency. The power converter is used with a maximum voltage step-up conversion ratio. The controller synchronizes to the mains frequency and determines a plurality of pulse intervals repeated at a pulse frequency where the pulse frequency is greater than a perceptual frequency of light intensity variations perceivable by a human eye.

36 Claims, 4 Drawing Sheets

METHOD AND SYSTEM FOR AVOIDING FLICKER OF SSL DEVICES

BACKGROUND

1. Technical Field

The present disclosure relates to illumination systems. In particular, the present disclosure relates to a method and system for avoiding flicker (in particular 100 Hz or 120 Hz flicker) in solid state lighting (SSL) devices such as LED (Light Emitting Diode) or OLED (Organic LED) assemblies.

2. Background

For many decades GLS (General Lighting Service) or incandescent lamps have been the first choice for illumination in residential applications. These light sources could easily be coupled to the mains power supply providing an AC (alternating current) voltage of e.g. 110V or 230V at a mains frequency of e.g. 60 Hz or 50 Hz. New types of light sources like LED (light emitting diode) lamps offer very small loads (typical a factor of 10 less than the equivalent GLS lamp). However, a solid state lighting (SSL) device such as an LED or Organic LED (OLED) device requires complex driver circuitry for providing the (typically constant) load voltage to the SSL device and for providing a (typically constant) load current to the SSL device.

The driver circuitry for an SSL device should be configured to convert the AC mains voltage into the possibly constant load voltage and the possibly constant load current. In particular, the driver circuitry should be configured to control the load voltage and the load current such that the SSL device does not flicker in a manner which is visible to the human eye. Such a visible flicker may occur at a frequency of 100 Hz (for an alternating mains voltage at a mains frequency of 50 Hz) or at a frequency of 120 Hz (for an alternating mains voltage at a mains frequency of 60 Hz). Such flicker may be due to the sinusoidal waveform of the alternating mains voltage which falls below the required minimum on-voltage $V_{on}$ of the SSL device within each half-wave of the sinusoidal mains voltage. As a result, the SSL device is switched off at a frequency of 100/120 Hz, thereby creating an annoying flicker effect of the light source (i.e. of the SSL device). The present disclosure addresses the above mentioned technical problem of SSL devices and describes an efficient method and system for driving a SSL device without a visible flicker.

SUMMARY

According to an aspect a controller for a driver circuit of a solid state lighting (SSL) device is described. The SSL device may be an LED or an OLED based device. The controller may be implemented as an integrated circuit or a microcontroller. The driver circuit may comprise a power converter configured to convert a varying input voltage into a drive voltage for the SSL device. Examples for power converters are a buck-boost converter or a resonant converter. The power converter may be used with a maximum voltage step-up conversion ratio. In other words, the power converter may be configured to provide at least a maximum voltage step-up conversion ratio between the varying input voltage and the drive voltage for the SSL device (which is typically the output voltage of the power converter). The drive voltage of the SSL device typically corresponds to the voltage across the SSL device (plus the voltage drop across a current source used for controlling the current through the SSL device).

The varying input voltage may be derived from the AC mains voltage at a mains frequency. Typically, the varying input voltage is a DC voltage derived from the AC mains voltage using a rectifier (e.g. a half-wave or a full-wave rectifier). As such, the varying input voltage may comprise a plurality of cycles, wherein each cycle has the form of the half cycle of a sinusoid.

The controller may be configured to synchronize to the mains frequency (which is e.g. 50 Hz or 60 Hz). For this purpose, the controller may be configured to sense the varying input voltage (e.g. using an event detector unit) and to detect a pre-determined (and periodic) voltage value within the varying input voltage. Furthermore, the controller may be configured to determine a plurality of pulse intervals repeated at a pulse frequency (The plurality of pulse intervals may be referred to as a sequence of pulse intervals). The plurality of pulse intervals may be regularly spaced. The pulse frequency may be a multiple of the cycle frequency, wherein the cycle frequency is the frequency of the cycles of the varying input voltage (the cycle frequency is e.g. twice the mains frequency). The pulse frequency may be greater than a perceptual frequency of light intensity variations perceivable by a human eye. Typical values for the perceptual frequency are in the range of 400 Hz. The perceptual frequency may be defined by the fact that the human eye is not able to perceive variations of the intensity of light at frequencies which are at or above the perceptual frequency (for a given intensity level).

As indicated above, the controller may be configured to determine a plurality of regularly spaced pulse intervals. The plurality of pulse intervals may be regularly spaced within a cycle of the varying input voltage and/or across the boundaries of succeeding cycles of the varying input voltage. In an embodiment, the controller is configured to determine a plurality of pulse intervals across a plurality of cycles of the varying input voltage, wherein each of the plurality of pulse intervals is positioned at a constant temporal distance from a directly preceding and/or a directly succeeding pulse interval. In other words, the controller may be configured to determine a plurality of pulse intervals (or a sequence of pulse intervals), such that the sequence of pulse intervals only comprises frequency components with frequencies which are at or above the pulse frequency.

The controller may be configured to position the plurality of pulse intervals such that the varying input voltage within the plurality of pulse intervals is greater than or equal to a pre-determined minimum input voltage. The pre-determined minimum input voltage may be determined based on an on-voltage of the SSL device divided by the maximum voltage step-up conversion ratio. By way of example, the pre-determined minimum input voltage may be determined by dividing the on-voltage of the SSL device with the maximum voltage step-up conversion ratio. If the SSL device is arranged in series with a current source, the pre-determined minimum input voltage may be determined based on the on-voltage of the SSL device, a minimum voltage drop across the current source and the maximum voltage step-up conversion ratio. By way of example, the pre-determined minimum input voltage may be determined by dividing the sum of the on-voltage of the SSL device and the minimum voltage drop across the current source with the maximum voltage step-up conversion ratio.

The controller may be configured to control the power converter to generate the drive voltage for the SSL device within the plurality of pulse intervals, such that the drive voltage within the plurality of pulse intervals corresponds at least to the on-voltage of the SSL device (plus a possible minimum voltage drop across the current source). Furthermore, the controller may be configured to control the power converter to generate substantially no drive voltage at time instants other than the plurality of pulse intervals (i.e. at time instants in between the pulse intervals). Alternatively, the controller may be configured to control the power converter such that at time instants other than the plurality of pulse intervals the SSL device is not emitting visible light (but possibly light in the non-visible frequency range).

As indicated above, the SSL device may be arranged in series to a current source providing the drive current to the SSL device. The controller may be configured to control the current source arranged in series to the SSL device to provide a drive current within the plurality of pulse intervals, thereby controlling the SSL device to emit light at an intensity level corresponding to the drive current. Typically, a constant drive current provides for a constant intensity level of the light emitted by the SSL device. The controller may be configured to control the current source to provide an overdrive drive current within the plurality of pulse intervals, thereby operating the SSL device in an overdrive mode within the plurality of pulse intervals. The overdrive drive current exceeds a maximum drive current which the SSL device is configured to withstand during a continuous operation. In other words, the SSL device may be operated to emit light at increased intensity levels within the plurality of pulse intervals, thereby compensating for the fact that the SSL device does not emit visible light in time intervals in between the plurality of pulse intervals.

The power converter is typically configured to provide a plurality of voltage conversion ratios between the varying input voltage and the drive voltage for the SSL device. Furthermore, the drive voltage (i.e. the output voltage of the power converter) typically comprises the on-voltage of the SSL device and the voltage drop across the current source (which is arranged in series to the SSL device). The controller may be configured to sense the varying input voltage and to control the power converter based on the sensed input voltage. In particular, the controller may be configured to control the power converter such that the voltage drop across the current source is maintained below a pre-determined maximum voltage drop across the current source. By doing this, it can be ensured that the power loss incurred by the driver circuit of the SSL device is reduced. The controller may also be configured to control the power converter such that the voltage drop across the current source is maintained at or above a pre-determined minimum voltage drop across the current source (which may be required to operate the current source).

As indicated above, the varying input voltage typically comprises periodic input voltage cycles at a cycle frequency of twice the mains frequency. The plurality of pulse intervals typically lies within a plurality of input voltage cycles, i.e. the sequence of pulse intervals goes across one or more cycle boundaries between adjacent input voltage cycles. Each of the plurality of input voltage cycles may comprise a respective subset of the plurality of pulse intervals. In other words, each of the plurality of input voltage cycles typically comprises one or more of the plurality of pulse intervals, e.g. each of the plurality of input voltage cycles comprises the same number of pulse intervals from the plurality of pulse intervals. Typically, the number of pulse intervals per input voltage cycle is given by the ratio of the pulse frequency and the cycle frequency. The pulse intervals comprised within the subsets may be positioned within the respective input voltage cycles at corresponding time intervals of the respective input voltage cycles. In other words, the pulse intervals comprised within the input voltage cycles may be positioned at corresponding positions within the input voltage cycles.

The controller may be configured to sense the drive voltage during a first input voltage cycle from the plurality of input voltage cycles, and to control the power converter during a succeeding second input voltage cycle from the plurality of input voltage cycles, based on the drive voltage sensed during the first input voltage cycle. In particular, the controller may be configured to sense the drive voltage during a pulse interval of the first input voltage cycle, and to control the power converter during a corresponding pulse interval of the second input voltage cycle, based on the drive voltage sensed during the pulse interval of the first input voltage cycle. Alternatively or in addition, the controller may be configured to store control parameters used for controlling the power converter during a pulse interval of a first input voltage cycle, and to control the power converter during a corresponding pulse interval of a second input voltage cycle using the stored control parameters (e.g. settings for the power converter). As such, the controller may be configured to adapt the control of the power converter during a current input voltage cycle based on the control of the power converter performed during one or more preceding input voltage cycles.

The controller may be configured to receive information regarding an intensity of ambient light of the SSL device at a time instant in between the plurality of pulse intervals, and to control the power converter based on the received information. As such, the pulsed operation of the SSL device may be used to automatically adapt the intensity of the SSL device to the ambient light conditions.

According to another aspect, a driver circuit for a solid state lighting (SSL) device is described. The driver circuit may be implemented as a single integrated circuit. The driver circuit comprises a power converter configured to convert a varying input voltage into a drive voltage for the SSL device. The input voltage is derived from a rectified AC mains voltage at the mains frequency. Furthermore, the driver circuit comprises a controller according to any of the aspects outlined in the present disclosure and configured to control the power converter to generate the drive voltage for the SSL device within a plurality of pulse intervals.

According to a further aspect, a light bulb assembly is described. The light bulb assembly comprises an electrical connection module configured to electrically connect to a mains power supply, thereby providing an input voltage waveform. Furthermore, the light bulb assembly comprises a driver circuit according to any of the aspects outlined in the present document and configured to convert the input voltage waveform into a drive signal for a solid state lighting (SSL) device. In addition, the light bulb assembly comprises the SSL device configured to provide light in accordance to the drive signal.

According to another aspect, a method for controlling a driver circuit of a solid state lighting (SSL) device is described. The driver circuit comprises a power converter configured to convert a varying input voltage into a drive voltage for the SSL device. The input voltage is derived from an AC mains voltage at a mains frequency, and the power converter is used with a maximum voltage step-up conversion ratio. The method comprises synchronizing to the mains frequency and determining a plurality of pulse intervals at a pulse frequency. The pulse frequency may be selected to be greater than a perceptual frequency of light intensity variations perceivable by a human eye. The varying input voltage within the plurality of pulse intervals may be greater than or equal to a pre-determined minimum input voltage and the minimum input voltage may correspond to an on-voltage of the SSL device divided by the maximum voltage step-up conversion ratio. The method may proceed in controlling the power converter to generate the drive voltage for the SSL device within the plurality of pulse intervals, such that the drive voltage within the plurality of pulse intervals corresponds at least to the on-voltage of the SSL device.

SHORT DESCRIPTION OF THE FIGURES

The present disclosure is explained below in an exemplary manner with reference to the accompanying drawings, wherein FIG. 1 illustrates a block diagram of an example light bulb assembly;

DETAILED DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz and in North America at 110-120 VAC at 60 Hz. The principles set out in the present document apply to any suitable electricity supply, including the mains/power line mentioned, and a rectified AC power supply.

Figure 1:
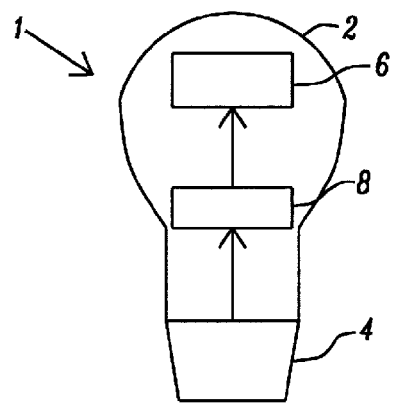

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as a SSL device) is provided within the housing 2. Examples for such light sources 6 are a solid state light source 6, such as a light emitting diode (LED) or an organic light emitting diode (OLED). The light source 6 may be provided by a single light emitting device, or by a plurality of LEDs. Typical SSL devices 6 comprise a plurality of LEDs arranged in series, such that the on-voltage $V_{on}$ of the SSL device results from the sum of on-voltages of the individual LEDs. Typical values for on-voltages of SSL devices are in the range of 100V-150V.

Usually, the voltage drop across an SSL device 6 remains substantially constant (at the on-voltage $V_{on}$ of the SSL device 6), regardless the intensity of the light emitted by the SSL device 6. The intensity of the light emitted by the SSL device 6 is typically controlled by the drive current through the SSL device 6.

Driver circuit 8 is located within the bulb housing 2, and serves to convert supply electricity (i.e. the mains supply) received through the electrical connection module 4 into a controlled drive voltage and drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximizing light output and light source life.

Accordingly, the housing is typically designed to enable heat generated by the light source to be conducted away from the light source, and out of the assembly as a whole.

Figure 2A:
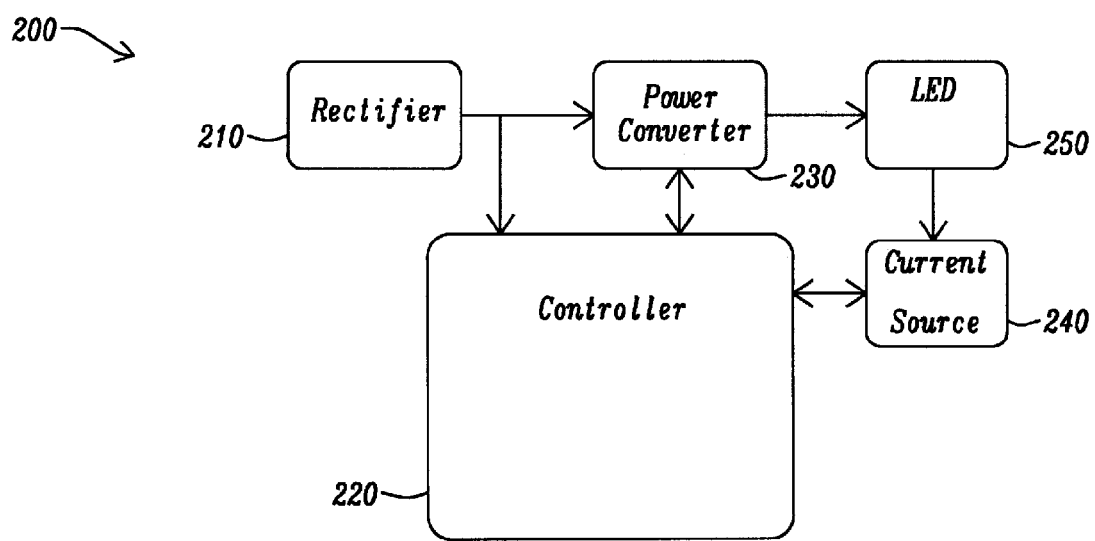
FIG. 2a shows a block diagram of example components of a driver circuit for a SSL device.

FIG. 2a illustrates example components of a driver circuit 200 of an SSL device 250. The driver circuit 200 comprises a rectifier 210 which receives alternating current (AC) supply electricity from the mains supply, and delivers a rectified current (DC) at its output. This DC power is received by a power converter 230 which serves to output a controlled DC drive voltage to the SSL device 250. Furthermore, the driver circuit 200 comprises a current source 240 which is configured to provide a controlled drive current to the SSL device 250. The voltage and current characteristics of the drive signal (comprising the drive voltage and the drive current) are determined by the type and number of LEDs employed in the light source 6 (i.e. in the SSL device 250). The power supplied to the SSL device 250 is controlled in dependence upon desired operating conditions of the SSL device 250. In one example, the SSL device 250 includes a plurality of LEDs connected in series, and requires a drive signal having a drive voltage of 50V or more. In general, the drive voltage may be in the range of 10V to over 100V depending on the number of LEDs comprised within the SSL device 250.

The driver circuit 200 may further comprise a controller 220 configured to control the power converter 230 and the current source 240 to generate an appropriate drive signal (i.e. an appropriate drive voltage and an appropriate drive current) as a function of the rectified mains voltage. In particular, the controller 220 may be configured to adapt a voltage conversion ratio of the power converter 230 based on the rectified (but varying) voltage provided by the rectifier 210.

Furthermore, the controller 220 may be configured to control the current source 240 to provide an appropriate drive current to the SSL device 250, thereby controlling the intensity of the light emitted by the SSL device 250.

The power converter 230 may comprise an inductive energy storage device and a switch device. The switch device may be controlled by the controller 220, and may be provided by a metal oxide semiconductor field effect transistor (MOSFET) device, or other device suitable for switching high voltage (for example, tens of volts). It should be noted, however, that the controller 220 may comprise the switch device itself, thereby directly controlling the provisioning of an appropriate drive voltage. The power converter 230 can be provided by any suitable circuit topology. For example, a buck converter circuit, a boost converter circuit, a buck/boost converter circuit, a SEPIC (single-ended primary-inductor converter) circuit, or a flyback converter circuit could be used for the power converter 230. It should be noted, however, that the power converter 230 is not limited to switched mode power converters, but may also be based on linear regulators or power converters using switched capacitors or any combination of these converter techniques.

Figure 2B:
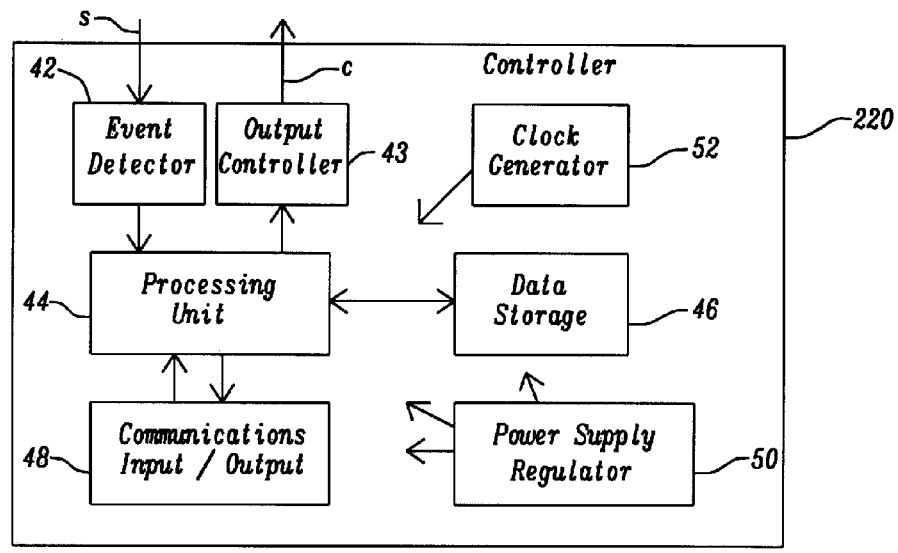
FIG. 2b shows a block diagram of example components of the controller of a driver circuit.

FIG. 2b illustrates an example block diagram of a controller 220. The controller 220 includes an event detector unit 42 connected for receiving sensor/feedback signals S (e.g. for receiving the rectified voltage provided by the rectifier 210), an output controller 43 for outputting control signals C (e.g. to the power converter 230 and/or to the current source 240), a processing unit 44 for overall control of the system, and a data storage unit 46 for storing data for use by the processing device. A communications input/output unit 48 may be provided for enabling the processing unit 44 to communicate with other devices, for example using a suitable wired or wireless communications protocol. The controller 220 also incorporates a power supply regulator 50, which supplies power to the devices within the controller 220, and a clock signal generator 52 (such as an oscillator circuit) for supplying a reference clock signal to the processing unit 44. The clock signal generator 52 may be configured to generate a clock signal from the sensor/feedback signals S (e.g. from the rectified voltage provided by the rectifier 210), thereby enabling a synchronization of the driver circuit 200 with the mains frequency. In other words, the clock signal generator 52 may make use of the periodicity of the mains cycle, in order to synchronize the driver circuit 200 with the mains cycle.

The processing unit 44 operates to generate the control signals C for controlling the switch device or devices in the power converter 230 and/or in the current source 240. Typically, the control signals will be pulse-width modulated (PWM) signals that control the duty cycle (that is, the ratio of the length of an 'on-state' of the switch over the length of a complete commutation cycle comprising an on-state phase and a succeeding off-state phase) of the switch device in the power converter 230, and hence to control the output drive voltage. In an embodiment, the controller 220 is implemented as a microcontroller or as an integrated circuit.

Figure 3:
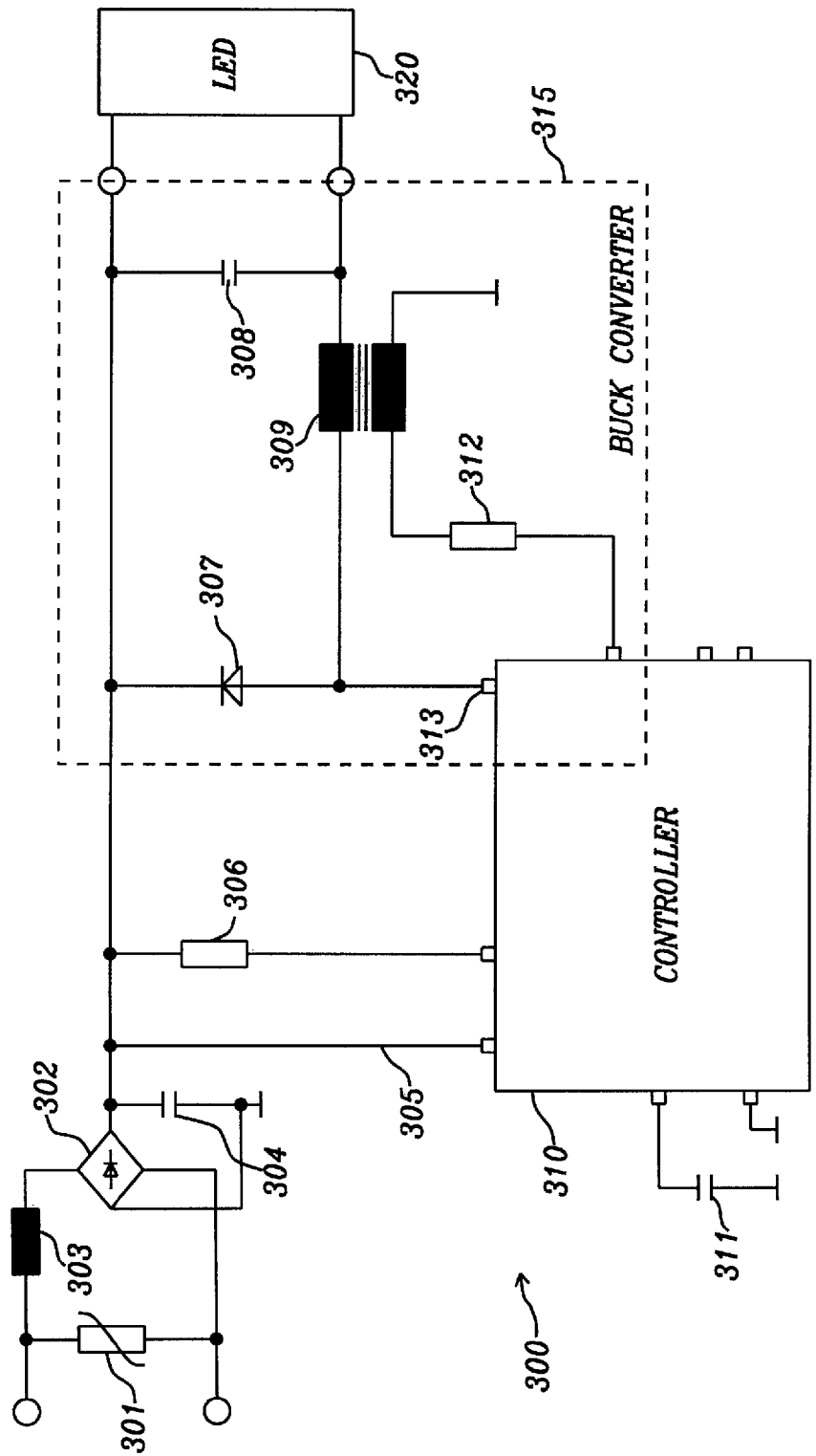
FIG. 3 illustrates a circuit diagram of an example driver circuit for a SSL device.

FIG. 3 illustrates a circuit diagram of an example driver circuit 8, 300 comprising a single stage LED power converter 230. The circuit diagram 300 shows the AC mains supply 301, as well as a rectifier 302 in combination with EMI (electromagnetic interference) filter components 303, 304. The driver circuit 300 comprises a controller 310 (e.g. the controller 220 of FIGS. 2a and 2b) which is connected to a stabilizing capacitor 311. The controller 310 comprises a startup and sense pin 305.

In the illustrated example, the pin 305 senses the rectified input voltage waveform and thereby enables the controller 310 to synchronize with the mains cycle and to control the generation of appropriate drive voltages and drive currents of the driver circuit 300. In the illustrated example, the controller 310 comprises some or all of the components of the controller 220 described in the context of FIG. 2b.

Furthermore, the controller 310 comprises an internal power switch connected to pin 313, which is used to implement a switched power converter 230 in conjunction with the external electronic components 307, 308, 309 and 312. In the illustrated example, the LED power converter 230 is implemented as a buck converter 315. The duty cycle of the power switch within the controller 310 can be adjusted (e.g. programmable) to control the drive voltage as a function of the rectified mains voltage waveform. Furthermore, the duty cycle of the power switch within the controller 310 can be adjusted to adapt the driver circuit 300 to the LED parameters (e.g. to the number of serial LEDs) of the LED assembly 320. In the illustrated example, the controller 310 also comprises the current source 240 for controlling the drive current through the SSL device 320.

Figure 4:
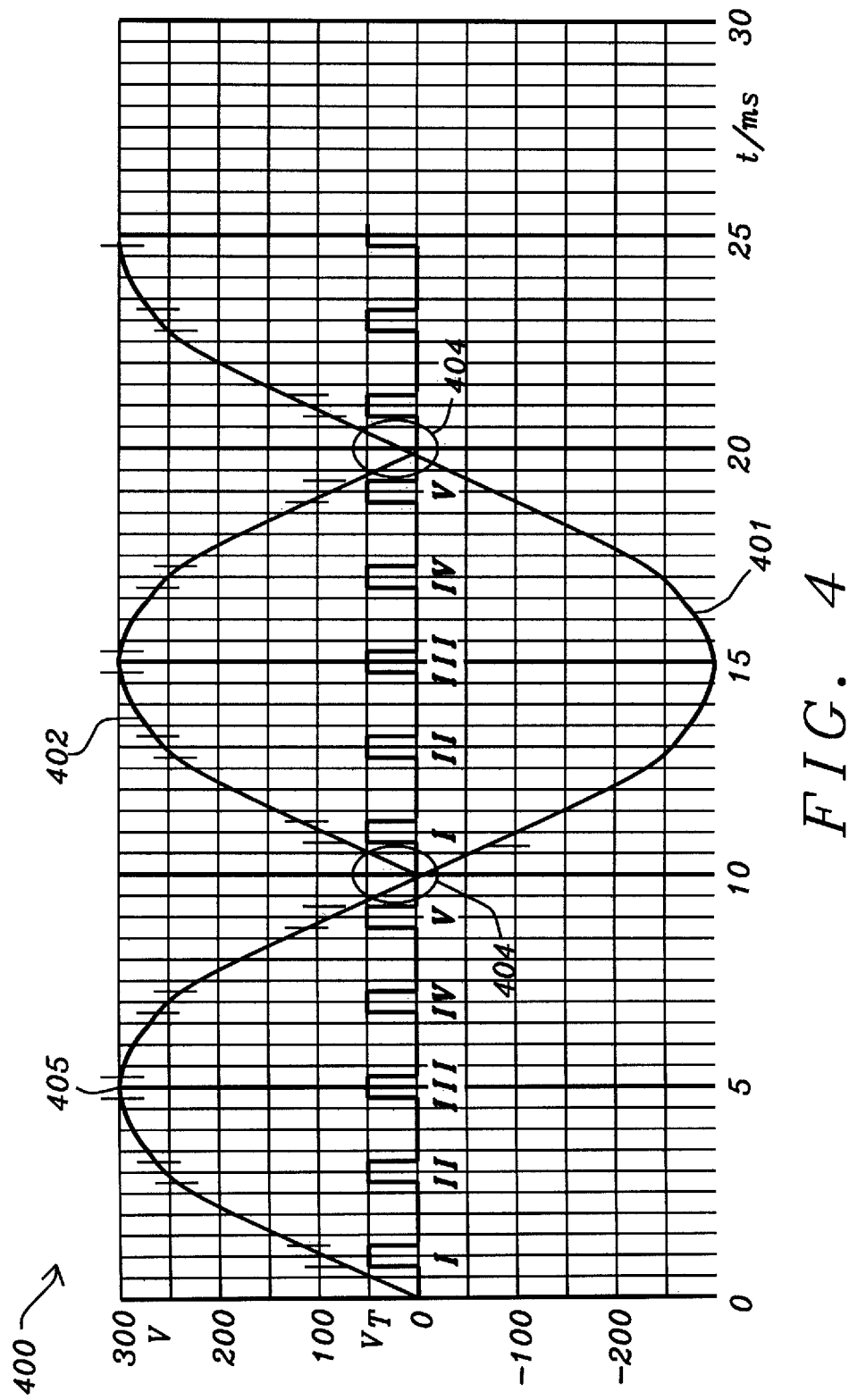
FIG. 4 shows an example mains voltage and an example drive voltage.

FIG. 4 shows a voltage/time diagram 400 of a cycle of the mains voltage. It can be seen that the AC mains voltage 401 oscillates in a sinusoidal manner at the cycle rate of 50 Hz. Furthermore, the diagram 400 shows the rectified voltage 402 at the output of the rectifier 302, 210. For illustrative purposes, it is assumed that the SSL device 250, 320 requires an on-voltage $V_{on}$ of 150V. Thus, the drive voltage provided by the power converter 230, 315 should be at or above the on-voltage $V_{on}$ of 150V, in order to ensure that the SSL device 250, 320 emits light. Furthermore, the voltage drop across the current source 240 should be minimized (reduced), in order to reduce the losses of the driver circuit 300, 200. Typically, the output voltage provided by the power converter 230 (i.e. the drive voltage) is the sum of the on-voltage $V_{on}$ of the SSL device 250 and the voltage drop across the current source 240 (if the output voltage is greater than the on-voltage $V_{on}$ of the SSL device 250). Furthermore, for ease of the following explanation, but without being limited to the example values, it is assumed that the power converter 230 is a combined step-up/step-down converter (e.g. a buck/boost converter) providing a maximum step-up voltage ratio of 3 (i.e. the output voltage of the power converter 230 may be up to 3 times higher than the input voltage) and a maximum step-down voltage ratio of 2 (i.e. the output voltage of the power converter 230 may be up to 2 times lower than the input voltage).

Under the above mentioned assumptions, it can be seen that in the areas around the zero crossings 404 of the AC mains voltage 401, the rectified voltage 402 falls below 50V such that the power converter 230 (providing a maximum step-up voltage ratio of 3) cannot supply the required on-voltage $V_{on}$ of the SSL device 250. As a consequence, the SSL device 250 does not generate light, whenever there is a zero crossing 404 of the AC mains voltage 401. As can be seen, the zero crossings 404 occur at a frequency which is twice the mains frequency, i.e. at a frequency of 100 Hz in the illustrated example. The latter frequency (i.e. twice the mains frequency) is referred to as the cycle frequency, because it refers to the frequency of occurrence of substantially identical (half-wave) cycles of the rectified mains voltage. Hence, the light generated by the SSL device 250 is interrupted at a cycle frequency of 100 Hz, thereby generating a visible flicker at 100 Hz.

One approach to overcoming the 100 Hz flicker issue could be to make use of a relatively large smoothening capacitor at the output of the rectifier 210. Such a smoothening capacitor smoothens the rectified voltage waveform 402, thereby removing the voltage dips 404 of the rectified voltage waveform 402. A smoothening capacitor (and in particular a large size smoothening capacitor) is however disadvantageous with regards to the integration of the driver circuit 200, 300 (as such a smoothening capacitor is typically mounted externally to an integrated circuit comprising the driver circuit 200, 300). Furthermore, such a smoothening capacitor has a relatively short life time, thereby reducing the life time of the driver circuit 200, 300 and of the complete light bulb assembly 1.

In the present document, it is proposed to remove the 100 Hz flicker by moving the flicker frequency into a frequency range which is not visible to the human eye. It can be shown that the sensitivity of the human eye to variations of light intensity is frequency dependent. By way of example, the human eye can detect variations of light intensity which occur at a frequency of 100 Hz and below. It has been shown that when in flickering light conditions, a human being has difficulties to estimate distances correctly. Due to this observation, the use of flickering light sources (e.g. light sources which flicker at 100 Hz) is prohibited in various applications such as traffic applications (e.g. in tunnels). On the other hand, it can be shown that for intensity variations at and above a certain frequency (e.g. at and above 400 Hz), the human eye cannot detect the flickering light and perceives the flickering light at an average intensity. As such, the human eye may be modeled as a low pass filter with regards to light variations, wherein the low pass filter may be approximated by a cut-off frequency at approx. 400 Hz.

The present document makes use of the above mentioned observation. It is suggested to drive the SSL device 250 in a pulsed mode at a frequency at or above the cut-off frequency for intensity variations of the human eye (e.g. at or above 400 Hz). This is illustrated in FIG. 4 which shows a sequence of pulse intervals 403 during which the power converter 230 and/or the current source 240 are activated, in order to generate a drive voltage and a drive current to the SSL device 250. The illustrated pulse intervals 403 have a frequency of e.g. 500 Hz (i.e. a frequency above the cut-off frequency for intensity variations of the human eye). Preferably, the pulse frequency is a multiple of the cycle frequency. Furthermore, the pulse intervals 403 are synchronized with the mains cycle, such that for each pulse interval 403 the rectified voltage 402 is at or above a pre-determined voltage threshold $V_T$ (e.g. $V_T$=50V in the illustrated example). The pre-determined voltage threshold $V_T$ typically depends on the power converter 230 (notably on the maximum step-up voltage ratio and possibly the maximum step-down voltage ratio of the power converter 230). The pre-determined voltage threshold $V_T$ may be selected such that the power converter 230 is able to generate at least the on-voltage $V_{on}$ of the SSL device 250 from the rectified voltage 402 during each of the pulse intervals 403 (plus a possible minimum voltage drop $V_{src,min}$ across a current source 240 arranged in series to the SSL device 250). In other words, the pulse intervals 403 should be placed such that the rectified voltage 402 is at or above the pre-determined voltage threshold $V_T$ within the pulse intervals 403, wherein the pre-determined voltage threshold $V_T$ corresponds to the on-voltage $V_{on}$ of the SSL device 250 (plus a possible minimum voltage drop $V_{src,min}$ across a current source 240 arranged in series to the SSL device 250) divided by the maximum step-up voltage ratio of the power converter 230.

As such, the pulse intervals 403 define time intervals during which the power converter 230 converts the rectified voltage 402 into a drive voltage and during which the current source 240 provides a (constant) drive current to the SSL device 250. Typically, no drive voltage and drive current is provided at time instances outside of the pulse intervals 403. In other words, typically the SSL device 250 only generates light during the pulse intervals 403, whereas no light is generated at time instances outside of the pulse intervals 403, i.e. in between the pulse intervals 403.

FIG. 4 also illustrates the voltage values 405 of the rectified voltage 402 corresponding to the pulse intervals 403, which are shown as "intervals" above the pulse intervals 403. The voltage values 405 of the rectifier voltage 402 within the pulse intervals 403 form voltage pulses 405 of the rectified voltage 402. For voltage pulses 405 of the rectified voltage 402 which comprise voltage values below the on-voltage $V_{on}$ of the SSL device 250 (here $V_{on}$=150V for example), the power converter 230 typically performs a step-up conversion, whereas for voltage pulses 405 of the rectified voltage 402 which comprise voltage values above the on-voltage $V_{on}$ of the SSL device 250, the power converter 230 typically performs a step-down conversion.

Hence, the controller 220 controls the conversion ratios of the power converter 230 for the different pulse intervals 403. In particular, the driver circuit 200 makes use of different conversion ratios of the power converter 230 for each pulse interval 403 within a rectified half-wave cycle of the mains voltage 401. Furthermore, the conversion ratios of the power converter may vary within each of the pulse intervals 403. The controller 220 may be configured to control the power converter 230 accordingly.

Figure 2C:
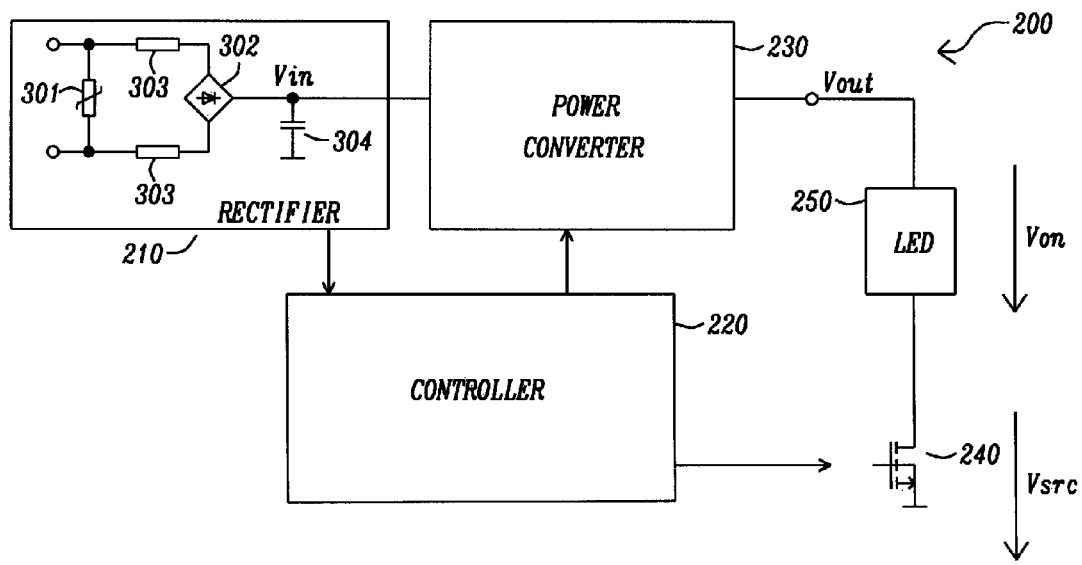
FIG. 2c shows another block diagram of example components of a driver circuit for a SSL device.

It should be noted that the power converter 230 is typically configured to provide a drive voltage (e.g. an output voltage $V_{out}$) to the SSL device 250 which is arranged in series to the current source 240, wherein the current source 240 provides the drive current to the SSL device 250. By way of example, the drive voltage $V_{out}$ may be $V_{out}=V_{on}+V_{src}$, wherein $V_{src}$ is the voltage drop across the current source 240. As such, the drive voltage $V_{out}$ provided by the power converter 230 should typically exceed the on-voltage $V_{on}$ of the SSL device 250 plus a minimum voltage drop $V_{src,min}$ required by the current source 240. In the above mentioned example, it was assumed that the minimum voltage drop $V_{src,src}$ is zero. In case of a minimum voltage drop $V_{src,min}$ greater zero (e.g. $V_{src,min}$=10V), the voltage threshold $V_T$ should correspond to the on-voltage $V_{on}$ of the SSL device 250 plus the minimum voltage drop $V_{src,min}$ across a current source 240, divided by the maximum step-up voltage ratio of the power converter 230 (as already indicated above). This is illustrated in FIG. 2c, where the driver circuit 200 is shown. The power converter 230 of the driver circuit 200 provides a drive voltage $V_{out}$ which corresponds to the sum of the on-voltage $V_{on}$ of the SSL device 250 and the voltage drop $V_{src}$ across the current source 240. For reducing the power loss, it is typically required to maintain the voltage drop $V_{src}$ across the current source 240 as close as possible to the minimum voltage drop $V_{src,min}$.

As a result of the pulsed operation of the power converter 230 and of the current source 240, the SSL device 250 is turned on (and off) at the frequency of the pulses 405, i.e. at the pulse frequency $f_p$. During every pulse, the SSL device 250 emits light at the same energy/intensity. However, due to the fact that the pulse frequency is at or above the cut-off frequency for intensity variations of the human eye, the human eye does not perceive the intensity variations and instead perceives constant light at an average intensity, wherein the average intensity depends on the intensity of the light emitted by the SSL device 250 during a pulse interval 403, the length of the pulse interval 403 and the time interval between two pulse intervals 403. By way of example, the average intensity may be given as the average of the intensity of the light emitted by the SSL device 250 during a complete pulse cycle (comprising the pulse interval 403 and the time interval between two succeeding pulse intervals 403). If $L_p$ is the intensity of the light emitted by the SSL device 250 during the pulse interval 403, if $T_p$ is the length of the pulse interval 403, then the average intensity $L_a$ may be $L_a=L_p*T_p*f_p$ (wherein "*" is the multiply operator). The term $T_p*f_p$ describes the on-rate of the lighted emitted by the SSL device 250.

As outlined above, the average intensity $L_a$ is typically reduced (compared to the full intensity $L_p$) due to the intermittent or pulsed operation of the SSL device 250. In the above example, the average intensity is reduced by $T_p*f_p$ (which is a factor ¼ in the example shown in FIG. 4). This may be disadvantageous in view of the average light intensity which is produced by the SSL device 250. It should be noted, however, that SSL device 250 can typically be operated in a so called overdrive mode for short periods of time. This means that for short periods of time, the SSL device 250 may be operated with an increased drive current, thereby emitting an increased intensity. The overdrive mode can typically not be applied for an extended period of time, due to an increased thermal energy created within the SSL device 250 causing thermal damage. However, when operated in the pulsed mode, as outlined above, the SSL device 250 may be operated in the overdrive mode, thereby emitting an increased intensity of light. The increased thermal energy may be dissipated during the time periods in between the pulse intervals 403, thereby enabling the operation of the SSL device 250 in an overdrive mode. By consequence, it is possible to operate the SSL device 250 during the pulse intervals 403 in an overdrive mode in which the SSL device 250 emits an increased overdrive intensity $L_o$. The overdrive intensity $L_o$ may be $1/T_p * f_p$ higher than the full intensity $L_p$ of the SSL device 250, thereby compensating for the pulsed operation of the SSL device 250 and generating the same average light intensity as in case of a continuous operation of the SSL device 250 at full intensity $L_p$. By way of example, a high voltage LED device can handle an overdrive drive current which exceeds the current for providing full intensity $L_p$ by a factor of three.

As outlined above, the power converter 230 is configured to convert voltage pulses 405 of the rectified voltage 402 into a drive voltage $V_{out}$, wherein the drive voltage $V_{out}$ typically comprises the on-voltage $V_{on}$ of the SSL device 250 and the voltage drop $V_{src}$ across the current source 240 (which is typically arranged in series to the SSL device 250, in order to control the current through the SSL device 250). The driver circuit 200 (i.e. notably the power converter 230 in conjunction with the controller 220) should be configured to generate a drive voltage $V_{out}$ which is at or above the on-voltage $V_{on}$ of the SSL device 250 (plus a possible minimum voltage drop $V_{src,min}$ across the current source 240). The voltage drop across the SSL device 250 is typically constant (i.e. at the on-voltage), regardless the drive current through the SSL device 250. At the same time, the drive voltage $V_{out}$ should be such that the voltage drop across the current source 240 is minimal or at least reduced, in order to reduce the losses incurred by the driver circuit 200. As can be seen from FIG. 4, the rectified voltage 402 varies within the voltage pulses 405. The power converter 230 may be controlled such that the varying rectified voltage 402 within a voltage pulse 405 is converted into a drive voltage $V_{out}$ which is as little as possible above the on-voltage $V_{on}$ of the SSL device 250 (plus a possible minimum voltage drop $V_{src,min}$ across the current source 240), thereby reducing the power loss at the current source 240. For this purpose, the power converter 230 may be configured to adapt its conversion ratio to the varying rectified voltage 402. In case of a buck/boost converter, this may be achieved by adapting the duty cycle (i.e. the fraction of a commutation cycle of the power converter during which the converter switch is in on-state) of the buck/boost converter to achieve a desired $V_{out} = V_{on} + V_{src,min}$. In case of a resonant power converter, this may be achieved by varying the commutation frequency of the converter switch).

Furthermore, it should be noted that the power converter 230 may require a certain convergence time interval at the beginning of a pulse interval 403 prior to providing a stabilized output voltage (i.e. a stabilized drive voltage) in response to the voltage pulse 405. The controller 220 may be configured to optimize (or to improve) the performance of the power converter 230 at the beginning of a pulse interval 403. In other words, the controller 220 may be configured to automatically learn the settings of the power converter 230 at the beginning of a pulse 405, in order to reduce the length of the convergence time interval. For this purpose, the controller 220 may make use of a feedback loop across successive cycles of the rectified voltage 402, wherein each cycle of the rectified voltage 402 may correspond to a half-wave of the AC main voltage 401, i.e. the cycle frequency is at twice the mains frequency. The controller 220 may be configured to sense the drive voltage $V_{out}$ at a cycle (n) and to select the settings of the power converter 230 for a succeeding cycle (n+1) based on the sensed drive voltage $V_{out}$ at the cycle (n) and/or based on the settings of the power converter 230 used for the cycle (n). In particular, the controller 220 may be configured to sense the drive voltage $V_{out}$ during a pulse interval 403 at the cycle (n) and to select the settings of the power converter 230 for a corresponding pulse interval 403 of the succeeding cycle (n+1) based on the sensed drive voltage $V_{out}$ during the pulse interval 403 of the cycle (n) and/or based on the settings of the power converter 230 used within the pulse interval 403 of the cycle (n). As such, the controller 220 may be configured to optimize the settings of the power converter 230 in an iterative manner from cycle to cycle.

In the following, an example implementation of a driver circuit 200 (in particular, of the controller 220) operating in a pulsed mode is described. As indicated above, the controller 220 may comprise an event detector unit 42. The event detector unit 42 may be configured to sense the rectified input voltage 402. In particular, the event detector unit 42 may be configured to determine whether the rectified input voltage 402 is above the voltage threshold $V_T$. As such, the event detector unit 42 may determine the time intervals for which the rectified input voltage 402 lies above the voltage threshold $V_T$. Furthermore, the event detector unit 42 may be configured to detect the voltage dips 404 of the rectified input voltage 402. These voltage dips 404 may be used to synchronize the operation of the driver circuit 200 with the mains cycle.

In addition, the controller 220 comprises a data storage unit 46 configured to store information regarding the pulse intervals 403 and/or the settings of the power converter 203 which are to be used during the respective pulse intervals 403. Table 1 shows an example table which may be stored in the data storage unit 46. The roman numbers I, II, III, IV, and V refer to the pulse intervals 403 indicated in FIG. 4. Table 1 indicates for each of the pulse intervals 403, the duty cycles which are to be performed by the power converters 230 (Duty cycle I, Duty cycle II, Duty cycle III, Duty cycle IV, Duty cycle V), in order to provide the desired output voltage $V_{out}$ within the respective pulse interval 403. The duty cycles are typically changed within each pulse interval 403, in order to account for changing voltage values 405 within the pulse intervals 403. By way of example, the duty cycle I is adapted such that the conversion ratio of the power converter 230 changes from 2.1 (at the beginning of the pulse interval I, 403) to 1.4 (at the end of the pulse interval I, 403).

TABLE 1

| Pulse interval | Power converter settings |
|---|---|
| I | Duty cycle I (power conversion 2.1-1.4) |
| II | Duty cycle II (power conversion 0.65-0.57) |
| III | Duty cycle III (power conversion 0.5) |
| IV | Duty cycle IV (power conversion 0.57-0.65) |
| V | Duty cycle V (power conversion 1.4-2.1) |

The controller 220, i.e. in particular, the processing unit 44 in conjunction with the event detector unit 42 and the clock signal generator unit 52, may be configured to place the pulse intervals I, II, III, IV, V into each cycle of the rectified input voltage 402, such that the time interval between adjacent pulse intervals 403 within a cycle and across the cycle boundaries is constant, thereby generating a continuous stream of pulse intervals 403 at a substantially constant temporal distance between succeeding pulse intervals 403; and the voltage value 405 within each of the pulse intervals 403 lies at or above the threshold voltage $V_T$.

By doing this, it can be ensured that the SSL device 250 is operated in a pulsed mode, wherein the sequence of pulses does not comprise a spectral component at a frequency which is below the cut-off frequency for light variations of the human eye. The placement of the pulse intervals 403 into a cycle of the rectified input voltage 402 may be performed by detecting that the rectified input voltage 402 exceeds a pre-determined voltage value, indicting the start of the first pulse interval I. The other pulse intervals II, III, IV, V may be placed at a predetermined temporal distance from the first pulse interval I.

The output controller 43 of the controller 220 may be configured to generate appropriate control signals to the power converter 230, in order to implement the duty cycles (and the power conversion ratios) illustrated in Table 1. Furthermore, the output controller 43 may be configured to generate appropriate control signals to the current source 240, in order control the intensity of the light emitted by the SSL device 250 during the pulse intervals 403.

As indicated above, the driver circuit 200 (e.g. the controller 220) may be configured to adapt the settings of the power converter 230 from cycle to cycle. For this purpose, the controller 220 may be configured to store updated power converter settings in the data storage unit 46 (e.g. in Table 1). The power converter settings may be updated in a cycle (n) of the rectified input voltage 402 and may be used in a following cycle (n+1) of the rectified input voltage 402. Typically, the power converter 230 comprises a control loop which adjusts the duty cycle of the power converter 230 based on the output voltage $V_{out}$ of the power converter 230, thereby adjusting the duty cycle such that the desired output voltage $V_{out}$ is obtained. The control loop typically operates at a commutation frequency of the power converter 230, wherein the commutation frequency is typically significantly higher than the cycle frequency (e.g. in the range of 100 kHz). Hence, it may be assumed that at each time instant within the pulse intervals 403, the control loop provides converged and stable duty cycles (i.e. converged and stable conversion ratios) of the power converter 230. These converged and stable duty cycles may be stored in the data storage unit 46 and may be used for controlling the power converter 230 in succeeding cycles of the rectified input voltage 402.

In the following, further aspects of the pulsed operation of the SSL device 250 are described. A further benefit of the pulsed operation of the SSL device 250 is the fact that the time intervals in between the periodic pulse intervals 403 may be used for various purposes. By way of example, the time intervals in between the periodic pulse intervals 403 may be used to perform measurements of the ambient light conditions of the SSL device 250 (because the SSL device 250 does not emit any light in the time intervals in between the pulse intervals 403). For this purpose, a light bulb assembly 1 may comprise a light sensor configured to measure the ambient light conditions. The driver circuit 200, notably the controller 220 of the driver circuit 200, may be configured to receive information regarding the ambient light conditions from the light sensor (e.g. information regarding an intensity of the ambient light). Furthermore, the controller 220 (of the driver circuit 200) may be configured to adjust the drive signal (notably the drive current) for the SSL device 250 based on the received information regarding the ambient light conditions. By way of example, the drive current (and consequently the intensity of the light emitted by the SSL device 250) may be reduced, as the intensity of the ambient light increases (and vice versa).

Alternatively or in addition, the time intervals in between the pulse intervals 403 may be used for transmitting information. By way of example, the SSL device 250 may be configured to emit infrared (IR) light (in addition to emitting visible light during the pulse intervals 403). The driver circuit 200 (and in particular the controller 220) may be configured to control the SSL device 250 to emit IR light pulses during the time intervals in between the pulse intervals 403 and to thereby transmit encoded information via a sequence of IR pulses within the time intervals in between the pulse intervals 403.

As outlined above, the time intervals between the pulse intervals 403 may be used e.g. for measurements of the ambient light and/or for communication/control purposes. In view of the fact that the time instants of the pulse intervals 403 are synchronized with the mains frequency, it may be ensured that a plurality of SSL devices 250 (e.g. within a corresponding plurality of light bulb assemblies 1) is operated in a synchronized manner with respect to one another. In other words, it may be ensured that the pulse intervals 403 for operating the plurality of SSL devices 250 are synchronized.

In cases where the mains power supply provides a plurality of phases, as e.g. the three-phase electric power providing three phases 0, 120 and 240 degrees, the plurality of pulse intervals 403 may be selected such that the conditions regarding the regular spacing of the pulse intervals 403 and regarding the minimum input voltage within the pulse intervals 403 are met for all the phases of the mains power supply, e.g. for the three phases of the three-phase electric power supply. Hence, the pulse intervals 403 may be placed within the plurality of phases such that the pulse intervals 403 are synchronized, regardless the phase of the plurality of phases that a SSL device 250 is operated with. Consequently, a plurality of SSL devices 250 may be operated within a same room such that the SSL devices 250 are on and off at the same time intervals, regardless the phase that the SSL devices 250 are operated with.

Finally, it should be noted that dimming of the SSL device may be implemented by modulating the current pulses provided by the current source, e.g. modulation the current pulses by the pulse width and or the current. Additional missing pulses are possible. As already indicated a DC power converter, switch matrix for the LED (parallel/series arrangement of LED) or capacitive voltage supply can be used to manage a constant voltage for the LED to avoid losses of the current source. Furthermore, it should be noted that the pulses of the SSL device 250 may be modulated (e.g. amplitude modulated) for communication purposes, e.g. for using the SSL device 250 as the transmitter of data communication. In general, data communication with the SSL device 250 may be used to control a degree of dimming of the light emitted by the SSL device 250 and/or a colour of the light emitted by the SSL device 250.

In the present document, a method and system for driving an SSL device without visible flicker are described. The described method and system operate the SSL device in a pulsed manner at a pre-determined pulse frequency, wherein the pulse frequency is above the cut-off frequency for intensity variations of the human eye. As a result, a visible flicker (e.g. a 100 Hz flicker) can be removed without the need of an external smoothening capacitor having a reduced life time.

In the present document, the term "couple" or "coupled" refers to elements being in electrical communication with each other, whether directly connected e.g., via wires, or in some other manner.

It should be noted that the description and drawings merely illustrate the principles of the proposed methods and systems.

Those skilled in the art will be able to implement various arrangements that, although not explicitly described or shown herein, embody the principles of the present disclosure and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the present disclosure, as well as specific examples thereof, are intended to encompass equivalents thereof.

The invention claimed is:

1. A controller for a driver circuit of a solid state lighting, referred to as SSL, device, wherein the driver circuit comprises a power converter configured to convert a varying input voltage into a drive voltage for the SSL device; wherein the input voltage is derived from a rectified AC mains voltage at a mains frequency; wherein the power converter is used with a maximum voltage step-up conversion ratio; wherein the controller is configured to synchronize to the mains frequency;

determine a plurality of pulse intervals repeated at a pulse frequency; wherein the pulse frequency is greater than a perceptual frequency of light intensity variations perceivable by a human eye; wherein the varying input voltage within the plurality of pulse intervals is greater than or equal to a pre-determined minimum input voltage; wherein the minimum input voltage corresponds to an on-voltage of the SSL device divided by the maximum voltage step-up conversion ratio; and control the power converter to generate the drive voltage for the SSL device within the plurality of pulse intervals, such that the drive voltage within the plurality of pulse intervals corresponds at least to the on-voltage of the SSL device.

2. The controller of claim 1, further configured to control the power converter to generate substantially no drive voltage at time instants other than the plurality of pulse intervals.

3. The controller of claim 1, further configured to control the power converter such that at time instants other than the plurality of pulse intervals the SSL device is not emitting visible light.

4. The controller of claim 1, further configured to control a current source arranged in series to the SSL device to provide a drive current within the plurality of pulse intervals, thereby controlling the SSL device to emit light at an intensity level corresponding to the drive current.

5. The controller of claim 4, further configured to control the current source to provide an overdrive drive current within the plurality of pulse intervals, thereby operating the SSL device in an overdrive mode within the plurality of pulse intervals; wherein the overdrive drive current exceeds a maximum drive current which the SSL device is configured to withstand during a continuous operation.

6. The controller of claim 4, wherein the power converter is configured to provide a plurality of voltage conversion ratios between the varying input voltage and the drive voltage;

the drive voltage comprises the on-voltage of the SSL device and a voltage drop across the current source;

the controller is configured to sense the varying input voltage; and the controller is configured to control the power converter such that the voltage drop across the current source is maintained below a pre-determined maximum voltage threshold.

7. The controller of claim 1, wherein the varying input voltage comprises periodic input voltage cycles at a cycle frequency of twice the mains frequency;

the plurality of pulse intervals lie within a plurality of input voltage cycles;

each of the plurality of input voltage cycles comprises a respective subset of the plurality of pulse intervals; and the pulse intervals comprised within the subsets are positioned within the respective input voltage cycles at corresponding time intervals of the respective input voltage cycles.

8. The controller of claim 7, further configured to sense the drive voltage during a first input voltage cycle from the plurality of input voltage cycles; and control the power converter during a succeeding second input voltage cycle from the plurality of input voltage cycles, based on the drive voltage sensed during the first input voltage cycle.

9. The controller of claim 8, further configured to sense the drive voltage during a pulse interval of the first input voltage cycle; and control the power converter during a corresponding pulse interval of the second input voltage cycle, based on the drive voltage sensed during the pulse interval of the first input voltage cycle.

10. The controller of claim 7, further configured to store control parameters used for controlling the power converter during a pulse interval of a first input voltage cycle; and control the power converter during a corresponding pulse interval of a second input voltage cycle using the stored control parameters.

11. The controller of claim 1, further configured to receive information regarding an intensity of ambient light of the SSL device at a time instant in between the plurality of pulse intervals; and control the power converter based on the received information.

12. A driver circuit of a solid state lighting, referred to as SSL device, wherein the driver circuit comprises a power converter configured to convert a varying input voltage into a drive voltage for the SSL device; wherein the input voltage is derived from a rectified AC mains voltage at a mains frequency;

a controller configured to:

synchronize to the mains frequency;

determine a plurality of pulse intervals repeated at a pulse frequency; wherein the pulse frequency is greater than a perceptual frequency of light intensity variations perceivable by a human eye; wherein the varying input voltage within the plurality of pulse intervals is greater than or equal to a pre-determined minimum input voltage; wherein the minimum input voltage corresponds to an on-voltage of the SSL device divided by the maximum voltage step-up conversion ratio; and control the power converter to generate the drive voltage for the SSL device within a plurality of pulse intervals, such that the drive voltage within the plurality of pulse intervals corresponds at least to the on-voltage of the SSL device.

13. The driver circuit of claim 12, further configured to control the power converter to generate substantially no drive voltage at time instants other than the plurality of pulse intervals.

14. The driver circuit of claim 12, further configured to control the power converter such that at time instants other than the plurality of pulse intervals the SSL device is not emitting visible light.

15. The driver circuit of claim 12, further configured to control a current source arranged in series to the SSL device to provide a drive current within the plurality of pulse intervals, thereby controlling the SSL device to emit light at an intensity level corresponding to the drive current.

16. The driver circuit of claim 15, further configured to control the current source to provide an overdrive drive current within the plurality of pulse intervals, thereby operating the SSL device in an overdrive mode within the plurality of pulse intervals; wherein the overdrive drive current exceeds a maximum drive current which the SSL device is configured to withstand during a continuous operation.

17. The driver circuit of claim 15, wherein
the power converter is configured to provide a plurality of voltage conversion ratios between the varying input voltage and the drive voltage;
the drive voltage comprises the on-voltage of the SSL device and a voltage drop across the current source;
the controller is configured to sense the varying input voltage; and
the controller is configured to control the power converter such that the voltage drop across the current source is maintained below a pre-determined maximum voltage threshold.

18. The driver circuit of claim 12, wherein
the varying input voltage comprises periodic input voltage cycles at a cycle frequency of twice the mains frequency;
the plurality of pulse intervals lie within a plurality of input voltage cycles;
each of the plurality of input voltage cycles comprises a respective subset of the plurality of pulse intervals; and
the pulse intervals comprised within the subsets are positioned within the respective input voltage cycles at corresponding time intervals of the respective input voltage cycles.

19. The driver circuit of claim 18, further configured to
sense the drive voltage during a first input voltage cycle from the plurality of input voltage cycles; and
control the power converter during a succeeding second input voltage cycle from the plurality of input voltage cycles, based on the drive voltage sensed during the first input voltage cycle.

20. The driver circuit of claim 19, further configured to
sense the drive voltage during a pulse interval of the first input voltage cycle; and
control the power converter during a corresponding pulse interval of the second input voltage cycle, based on the drive voltage sensed during the pulse interval of the first input voltage cycle.

21. The driver circuit of claim 18, further configured to
store control parameters used for controlling the power converter during a pulse interval of a first input voltage cycle; and
control the power converter during a corresponding pulse interval of a second input voltage cycle using the stored control parameters.

22. The driver circuit of claim 12, further configured to
receive information regarding an intensity of ambient light of the SSL device at a time instant in between the plurality of pulse intervals; and
control the power converter based on the received information.

23. The driver circuit of claim 12, wherein the power converter is a buck-boost converter or a resonant converter.

24. A light bulb assembly comprising
an electrical connection module configured to electrically connect to a mains power supply, thereby providing an input voltage waveform;
a driver circuit, configured to convert the input voltage waveform into a drive signal for a solid state lighting, referred to as SSL, device, comprising:
 a power converter configured to convert a varying input voltage into a drive voltage for the SSL device; wherein the input voltage is derived from a rectified AC mains voltage at a mains frequency;
 a controller configured to:
  synchronize to the mains frequency;
  determine a plurality of pulse intervals repeated at a pulse frequency; wherein the pulse frequency is greater than a perceptual frequency of light intensity variations perceivable by a human eye; wherein the varying input voltage within the plurality of pulse intervals is greater than or equal to a pre-determined minimum input voltage; wherein the minimum input voltage corresponds to an on-voltage of the SSL device divided by the maximum voltage step-up conversion ratio;
  control the power converter to generate the drive voltage for the SSL device within a plurality of pulse intervals, such that the drive voltage within the plurality of pulse intervals corresponds at least to the on-voltage of the SSL device; and
the SSL device configured to provide light in accordance to the drive signal.

25. The light bulb assembly of claim 24, further configured to
control the power converter to generate substantially no drive voltage at time instants other than the plurality of pulse intervals.

26. The light bulb assembly of claim 24, further configured to
control the power converter such that at time instants other than the plurality of pulse intervals the SSL device is not emitting visible light.

27. The light bulb assembly of claim 24, further configured to
control a current source arranged in series to the SSL device to provide a drive current within the plurality of pulse intervals, thereby controlling the SSL device to emit light at an intensity level corresponding to the drive current.

28. The light bulb assembly of claim 27, further configured to
control the current source to provide an overdrive drive current within the plurality of pulse intervals, thereby operating the SSL device in an overdrive mode within the plurality of pulse intervals; wherein the overdrive drive current exceeds a maximum drive current which the SSL device is configured to withstand during a continuous operation.

29. The light bulb assembly of claim 27, wherein
the power converter is configured to provide a plurality of voltage conversion ratios between the varying input voltage and the drive voltage;
the drive voltage comprises the on-voltage of the SSL device and a voltage drop across the current source;
the controller is configured to sense the varying input voltage; and
the controller is configured to control the power converter such that the voltage drop across the current source is maintained below a pre-determined maximum voltage threshold.

30. The light bulb assembly of claim 24, wherein
the varying input voltage comprises periodic input voltage cycles at a cycle frequency of twice the mains frequency;
the plurality of pulse intervals lie within a plurality of input voltage cycles;
each of the plurality of input voltage cycles comprises a respective subset of the plurality of pulse intervals; and
the pulse intervals comprised within the subsets are positioned within the respective input voltage cycles at corresponding time intervals of the respective input voltage cycles.

31. The light bulb assembly of claim 30, further configured to
sense the drive voltage during a first input voltage cycle from the plurality of input voltage cycles; and
control the power converter during a succeeding second input voltage cycle from the plurality of input voltage cycles, based on the drive voltage sensed during the first input voltage cycle.

32. The light bulb assembly of claim 31, further configured to
sense the drive voltage during a pulse interval of the first input voltage cycle; and
control the power converter during a corresponding pulse interval of the second input voltage cycle, based on the drive voltage sensed during the pulse interval of the first input voltage cycle.

33. The light bulb assembly of claim 30, further configured to
store control parameters used for controlling the power converter during a pulse interval of a first input voltage cycle; and
control the power converter during a corresponding pulse interval of a second input voltage cycle using the stored control parameters.

34. The light bulb assembly of claim 24, further configured to
receive information regarding an intensity of ambient light of the SSL device at a time instant in between the plurality of pulse intervals; and
control the power converter based on the received information.

35. The light bulb assembly of claim 24, wherein the power converter is a buck-boost converter or a resonant converter.

36. A method for controlling a driver circuit of a solid state lighting, referred to as SSL, device, wherein the driver circuit comprises a power converter configured to convert a varying input voltage into a drive voltage for the SSL device; wherein the input voltage is derived from an AC mains voltage at a mains frequency; wherein the power converter is used with a maximum voltage step-up conversion ratio; the method comprising
synchronizing to the mains frequency;
determining a plurality of pulse intervals at a pulse frequency; wherein the pulse frequency is greater than a perceptual frequency of light intensity variations perceivable by a human eye; wherein the varying input voltage within the plurality of pulse intervals is greater than or equal to a pre-determined minimum input voltage; wherein the minimum input voltage corresponds to an on-voltage of the SSL device divided by the maximum voltage step-up conversion ratio; and
controlling the power converter to generate the drive voltage for the SSL device within the plurality of pulse intervals, such that the drive voltage within the plurality of pulse intervals corresponds at least to the on-voltage of the SSL device.

* * * * *